US010364790B2

(12) United States Patent
Pasanen et al.

(10) Patent No.: US 10,364,790 B2
(45) Date of Patent: Jul. 30, 2019

(54) WAVE ENERGY RECOVERY APPARATUS WITH AN ENERGY TRANSFER ARRANGEMENT

(71) Applicant: AW-ENERGY OY, Vantaa (FI)

(72) Inventors: Sami Pasanen, Vantaa (FI); Jussi Akerberg, Espoo (FI); Arvo Jarvinen, Vantaa (FI)

(73) Assignee: AW-ENERGY OY, Vantaa (FI)

( * ) Notice: Subject to any disclaimer, the term of this patent is extended or adjusted under 35 U.S.C. 154(b) by 204 days.

(21) Appl. No.: 15/318,949

(22) PCT Filed: Jun. 18, 2014

(86) PCT No.: PCT/FI2014/050485
§ 371 (c)(1),
(2) Date: Dec. 14, 2016

(87) PCT Pub. No.: WO2015/193532
PCT Pub. Date: Dec. 23, 2015

(65) Prior Publication Data
US 2017/0114769 A1    Apr. 27, 2017

(51) Int. Cl.
*F03B 13/18* (2006.01)
*F03B 13/26* (2006.01)

(52) U.S. Cl.
CPC .......... *F03B 13/182* (2013.01); *F03B 13/262* (2013.01); *F05B 2220/70* (2013.01);
(Continued)

(58) Field of Classification Search
CPC ...... F03B 13/182; F03B 13/262; F15B 1/024; F15B 7/08; F15B 11/22; F15B 15/1428
(Continued)

(56) References Cited

U.S. PATENT DOCUMENTS 2,193,736 A * 3/1940 Onions ................... F01B 17/00
                                                    91/206
4,373,334 A * 2/1983 Carlander ................ A47B 9/10
                                                   248/188.5
(Continued)

FOREIGN PATENT DOCUMENTS

GB      1544331       4/1979
WO      2010049708    5/2010
WO      2014053839    4/2014

OTHER PUBLICATIONS

International Search Report for International Application No. PCT/FI2014/050485 dated Mar. 13, 2015.
Examination Report for AU2014397698 dated Jun. 18, 2018.

*Primary Examiner* — Thomas E Lazo
*Assistant Examiner* — Richard C Drake
(74) *Attorney, Agent, or Firm* — Christopher M. Scherer; DeWitt LLP (57) ABSTRACT

This invention relates to a wave energy recovery apparatus with an energy transfer arrangement comprising at least a base, a reciprocating panel, a pivot shaft for the reciprocating panel, a control system, and a driving and power-take-off (PTO) arrangement equipped with an actuating mechanism (6), and one or more power-take-off (PTO) units to convert kinetic energy of waves or tidal currents to another type of energy, each PTO unit comprising a hydraulic power transmission mechanism having hydraulic cylinders with pistons inside the hydraulic cylinders. The pistons are fastened with their free ends to the common connecting plate that is arranged to move all the pistons simultaneously inwards into the hydraulic cylinders and to draw all the pistons simultaneously outwards from the hydraulic cylinders.

18 Claims, 7 Drawing Sheets

(52) U.S. Cl.
CPC ....... *F05B 2230/80* (2013.01); *F05B 2240/40* (2013.01); *F05B 2260/406* (2013.01); *Y02E 10/38* (2013.01)

(58) Field of Classification Search
USPC .................. 60/412, 398; 290/53; 91/508
See application file for complete search history.

(56) References Cited

U.S. PATENT DOCUMENTS

| | | | | |
|---|---|---|---|---|
| 4,400,940 | A * | 8/1983 | Watabe | F03B 13/182 417/330 |
| 4,580,400 | A * | 4/1986 | Watabe | F03B 13/182 290/53 |
| 5,374,850 | A | 12/1994 | Cowen | |
| 5,819,632 | A * | 10/1998 | Moody | F15B 11/0365 91/519 |
| 6,454,542 | B1 * | 9/2002 | Back | F04B 9/1172 417/342 |
| 7,023,104 | B2 * | 4/2006 | Kobashikawa | B01D 61/10 290/42 |
| 7,448,210 | B1 | 11/2008 | Andalia | |
| 7,834,474 | B2 * | 11/2010 | Whittaker | F03B 13/182 290/53 |
| 8,887,497 | B2 * | 11/2014 | Travis | F15B 3/00 60/398 |
| 9,109,570 | B2 * | 8/2015 | Jarvinen | F03B 13/182 |
| 9,902,467 | B2 * | 2/2018 | Lin | F03B 13/182 |
| 2005/0066654 | A1 * | 3/2005 | Koivusaari | F03B 13/182 60/398 |
| 2008/0000632 | A1 * | 1/2008 | Brecheisen | E21B 43/126 166/72 |
| 2010/0140945 | A1 | 6/2010 | Andujar | |
| 2011/0030361 | A1 * | 2/2011 | Gopalswamy | F03D 5/06 60/398 |
| 2011/0083643 | A1 * | 4/2011 | Sturman | F01B 11/006 123/46 R |
| 2012/0134855 | A1 * | 5/2012 | Brown | F15B 7/08 417/271 |
| 2012/0181790 | A1 * | 7/2012 | Finnigan | F03B 13/1805 290/54 |
| 2014/0230426 | A1 * | 8/2014 | Tuokkola | F03B 13/16 60/497 |
| 2014/0326910 | A1 * | 11/2014 | Garrievich | F03B 3/18 251/129.11 |
| 2015/0144325 | A1 * | 5/2015 | Heidecke | E21B 19/00 166/77.4 |

* cited by examiner

WAVE ENERGY RECOVERY APPARATUS WITH AN ENERGY TRANSFER ARRANGEMENT

CROSS REFERENCE TO RELATED APPLICATIONS

The present application is the U.S. national stage application of International Application PCT/FI2014/050485, filed Jun. 18, 2014, which international application was published on Dec. 23, 2015, as International Publication WO2015/193532, the content of which is incorporated herein by reference in its entirety.

FIELD

The present invention relates to a wave energy recovery apparatus with an energy transfer arrangement as defined in the preamble of claim 1.

The wave energy recovery apparatus according to the invention is suited very well for instance to be used in connection with a panel or flap or essentially plate-like wing element, later called shorter only as panels, hinged with its lower edge to make a reciprocating movement caused by wave energy or tidal energy of seawater. The wave energy or tidal energy collected is further converted underwater with a conversion unit for instance to electric energy. For the sake of simplicity, only the term wave energy is later mentioned when both the wave energy and the tidal energy of seawater are meant.

BACKGROUND

According to prior art there are various types of wave energy recovery systems where the arrangements include a base and, for instance, one or more panels pivotally connected to the base to make a reciprocating or oscillating movement about a rotation axis or pivot axis in response to wave forces or tidal forces. The oscillating movement is then converted for example to electric energy with the help of a power-take-off (PTO) unit equipped with a power-take-off (PTO) machinery comprising a generator or alike.

Commonly a PTO unit of prior art wave energy conversion devices is connected more or less permanently to the reciprocating panel of the wave conversion device as is shown for example in the international patent publication No. WO2006/100436 A1. For instance FIG. 6a of the publication shows a device, which has a panel attached by pivot shafts to a base portion, and a driving rod pivotally attached to each side of the panel. Each driving rod connects to a piston inside a hydraulic cylinder, which is pivotally attached to the base portion. In use, the panel oscillates in response to wave action, and the driving rods are driven to cause hydraulic fluid in the hydraulic cylinders to be pressurized by the action of the pistons moved by the driving rods.

Because of massive forces and torques on the pivot shaft, the driving and PTO mechanisms used must be usually hydraulic. However, the reciprocating panel causes still huge reciprocating forces to the driving mechanisms. These reciprocating forces cause extreme fatigue stress to the structure, which leads easily the various fatigue breakdowns. For these reasons also hydraulic driving and PTO arrangements used must be big and robust, and then they are also heavy and expensive.

Another problem with hydraulic driving and PTO arrangements according to prior art is that they require a lot of maintenance and/or repairs, and their lifetime is considerably short. Also the maintenance and/or repairs of the driving and PTO assemblies according to prior art can be time consuming, expensive and even dangerous. Typically, the maintenance and/or repairs must be performed at the production site in-situ, which means that all the work must be done on the bottom of the sea. Thus, for instance, divers are needed to perform the job. The job is slow, difficult and expensive, and can also be dangerous. In addition, since the maintenance mostly must be conducted underwater, the internal components that are usually protected from the water may undesirably get wet during the maintenance or work. Also, the wave energy conversion devices according to prior art must be made inactive during maintenance and repairs. This causes unnecessary shutdown times during which wave energy cannot be recovered.

The maintenance and repairs problem mentioned above has been tried to solve by a solution shown in the international patent publication No. WO2011/026173 A1. This WO publication shows a structure where one or more modular energy transfer mechanisms are connected with a pivot shaft of the wave energy recovery apparatus. The installation and removal of the modular energy transfer mechanism can be done when the panel portion of the apparatus has been lowered into its flat "survival mode" configuration as mentioned in the WO publication. This solution has several disadvantages. Firstly the modular energy transfer mechanisms are connected directly onto the pivot shaft that causes massive forces and torques. Consequently the structure of modular energy transfer mechanism is extremely prone to various fatigue breakdowns and therefore the structure of energy transfer mechanism according to the WO publication must be big and robust, and is therefore also expensive. Another problem is the installation and removal of the modular energy transfer mechanisms. It can be easy and fast only after the panel portion of the apparatus has been lowered into its flat "survival mode" configuration, but that task is extremely difficult, if not almost impossible in prevailing ocean conditions where waves never stop moving.

Also the control of the apparatuses according to prior art has caused problems because the force of waves varies a lot. One prior art solution is shown in the international publication No. WO2014/053839 A1. The arrangement according the WO publication has two hydraulic cylinders with different internal diameters. When the forces of the waves are small the smaller hydraulic cylinder is in use and when the forces of the waves are greater the bigger cylinder can be used. In very powerful conditions both the hydraulic cylinders can be used together. This solution makes the controlling simpler but the pistons move still back and forth in the cylinders driven directly by the reciprocating panel, which cause serious fatigue problems to the structure.

The same problems applies also to the solution shown in the international publication No. WO2013/140042 A2. The publication shows an arrangement where two different sized hydraulic cylinders has been joined together and two different sized pistons make a reciprocating movement in the hydraulic cylinders, one piston in each cylinder. The arrangement is equipped with a control system by which the arrangement can be controlled according to the forces of the waves affecting to the arrangement. Fatigue problems in this arrangement are serious because at least the bigger hydraulic cylinder is considerably big. To avoid the fatigue problems mentioned the structure of the arrangement must be robust and heavy which leads easily to very expensive structures that are also difficult to handle.

SUMMARY

The object of the present invention is to eliminate the drawbacks described above and to achieve a reliable, compact, economical and efficient wave energy conversion apparatus in order to be able to capture a maximum amount of available wave or tidal energy and which apparatus is easily and in a versatile way controllable. Another object of the present invention is to make the installation, maintenance and repairs of the wave energy conversion apparatus easy and fast, and to make it possible to easily disconnect/connect the PTO arrangements from/to the other structure as one package without disturbing the functions of the other structure. Yet one object of the present invention is also to achieve an apparatus that is simple and lightweight in its structure, and also durable and stands for long time without fatigue breakdowns the massive forces caused by the reciprocating motion. The wave energy conversion apparatus according to the invention is characterized by what is presented in the characterization part of claim 1. Other embodiments of the invention are characterized by what is presented in the other claims.

The solution of the invention has the advantage that its structure is simple, lightweight and economical and very durable enduring typical fatigue stresses in its neighborhood very well. Also many other structural advantages are achieved because the energy is captured only with a linear pushing motion. That saves among other things the structures of the driving and PTO arrangements. One advantage is that the arrangement according to the invention has not many moving components. In that case the arrangement works very reliably and just as it has been designed to work. One significant advantage is that there is no need to stop the reciprocating motion of the panel when the PTO unit is removed from the energy recovery arrangement for maintenance or repair purposes, or installed back after the maintenance or repairs. Also one advantage is that the PTO unit is a separate modular structure that is easy to lock motionless and then remove as one package and lift to the surface of the sea for the maintenance, change or repairs. Yet one more advantage is that the arrangement can be easily arranged to a safe position that protects the structure of the wave energy recovery apparatus against stormy conditions. That makes also the dimensioning in the planning phase easier and simpler. Further one advantage is that the apparatus is easily controllable to work as well as possible in different weather conditions. And one further advantage is that a part of the energy capturing hydraulic cylinders can be easily switched off without disturbing the operation of the other hydraulic cylinders. That feature can be used for instance when a part of hydraulic cylinders and pistons needs repair of maintenance, or when apparatus is controlled according to weather or wave conditions.

BRIEF DESCRIPTION OF THE DRAWINGS

In the following, the invention will be described in detail by the aid of examples by referring to the attached simplified and diagrammatic drawings, wherein.

DETAILED DESCRIPTION OF THE DRAWINGS

The basic idea of the present invention is to achieve a lightweight, efficient and extremely durable structure of the wave energy recovery apparatus, and to connect the power-take-off unit or PTO unit and the driving unit together as simply as possible and in a way that makes the removal and installation of the PTO unit easy and fast, and that also makes it possible to protect the structures of the wave energy recovery apparatus easily and fast against stormy conditions, and to achieve a wave energy recovery apparatus that is easily and fast controllable according wave and weather conditions.

Figures 1, 2, 2A:
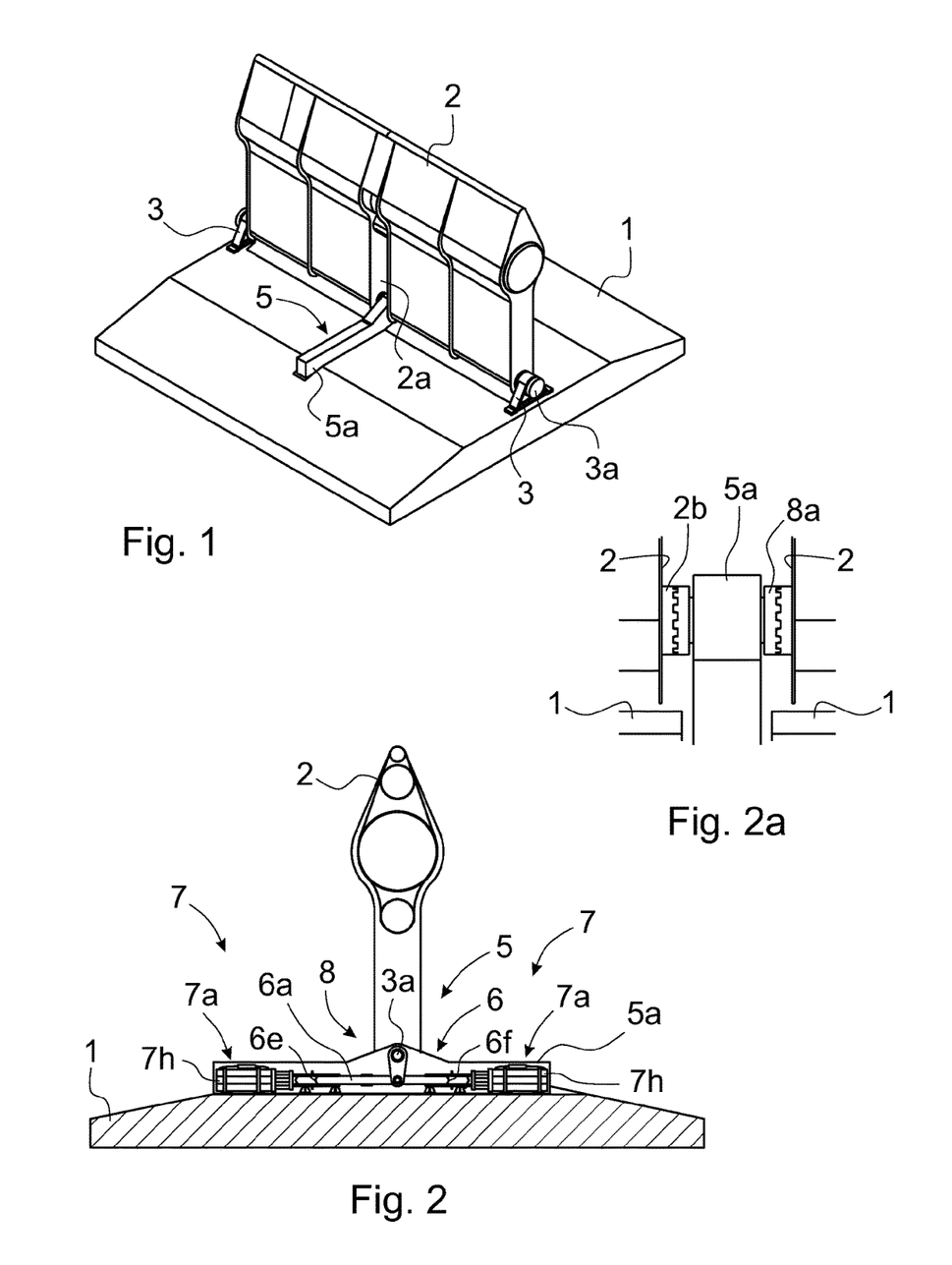
FIG. 1 presents a simplified oblique top view of a wave energy recovery apparatus according to the invention.
FIG. 2 presents in a side view, partially cross-sectioned and in a simplified and diagrammatic way a wave energy recovery apparatus according to the invention.
FIG. 2a presents in a front view and in a simplified and diagrammatic way a tooth coupling assembly between the halves of the reciprocating panel of wave energy recovery according to the invention.

FIGS. 1 and 2 present a wave energy recovery apparatus according to the invention in two different views. The wave energy recovery apparatus comprises at least a base 1, a panel 2 reciprocating about its pivot shaft 3a, a driving and power-take-off (PTO) arrangement 5 having an actuating mechanism 6 and one or more hydraulic PTO units 7. The actuating mechanism 6 is arranged to transfer a reciprocating motion of the panel 2 mechanically to a linear motion of hydraulic pistons in hydraulic cylinders that act in this embodiment of the invention as a part of the hydraulic power transmission mechanism of the PTO units 7.

The reciprocating panel 2 oscillates on the base 1 back and forth with the movement of seawater for recovering kinetic energy like wave energy of seawater. The panel 2 comprises two parallel halves with a vertical gap 2a extending upwards from the lower edge of the panel 2 in the middle of the panel 2 between the two halves of the panel 2. The upper part of the panel 2 is unbroken without the gap 2a. At the production site the base 1 is mounted onto the bottom of the sea. On the base 1 there are advantageously two or possibly more supporting legs 3 that are fastened onto the base 1 so that at least one supporting leg 3 is situated at each side of the panel 2. At its upper end each supporting leg 3 supports an essentially horizontal, back and forth rotating pivot shaft 3a on which the two halves of the panel 2 are mounted at their lower edges so that the panel 2 can make a reciprocating motion along the movement of the seawater, for instance along the movement of waves. The pivot shaft 3a can be a common shaft reaching from the first side of the panel 2 to the second side of the panel 2, or it can also be formed from several separate parts, for instance from three separate parts so that one part is at each outer side of the panel 2 and one common shaft part to both the halves of the panel 2 is horizontally in the middle of the panel 2. The panel 2 and the pivot shaft 3a rotate back and forth together simultaneously and at the same speed of rotation.

The driving and PTO arrangement 5 has been placed into the gap 2a of the two lower halves of the panel 2 and fastened onto the base 1. The driving and PTO arrangement 5 is situated symmetrically in relation to the pivot shaft 3a of the panel 2 in the direction of the width of the panel 2, and also in the direction of the reciprocating motion of the panel 2. In that kind of an arrangement there are one or more mutually symmetrically placed PTO units 7 at either side of the panel 2 in the direction of the reciprocating motion of the panel 2. Equally, the PTO units 7 can also be placed in many other ways. For instance, all the PTO units 7 can be situated at the same side of the panel 2 in the direction of the reciprocating motion of the panel 2. Then the PTO units 7 can be situated either parallel to each other or one upon the other. The driving and PTO arrangement 5 is protected with a sealed protection cover 5a against seawater.

The actuating mechanism 6 having a rectilinear actuating rod 6a is connected about its middle part through a lever mechanism 8 to a lower part of the panel 2 and arranged to make reciprocating linear motion together with the panel 2. The actuating rod 6a has two ends that act as the first pusher end 6e and the second pusher end 6f. The pusher ends 6e, 6f are free ends so that they are not fastened or otherwise anchored or fixed to any other part of the arrangement. The pusher ends 6e, 6f are only arranged to push the power transmission mechanism of the PTO units 7 in turns so that when the first pusher end 6e is pushing the power transmission mechanism of the first PTO unit 7 the second pusher end 6f is returning from pushing the power transmission mechanism of the second PTO unit 7. The power transmission mechanism of the PTO units 7 in this embodiment is a group of pistons 9 in a group 7a of hydraulic cylinders 7h. The group 7a of hydraulic cylinders 7h is later called also more shortly the hydraulic cylinder block 7a. By this way the actuating mechanism 6 is arranged to transfer the reciprocating motion of the panel 2 mechanically to the linear motion of the pistons 9 of the hydraulic PTO units 7 of this example embodiment. The open ends of the hydraulic cylinders 7h are secured to a common end plate 7g and the free ends of the piston rods 9e of the pistons 9 are secured to a common connecting plate 9c. These structures are described later in a more detailed way.

FIG. 2a presents a tooth coupling assembly between the two halves of the reciprocating panel 2. The actuating mechanism 6 comprises the lever mechanism 8 with a pair of mutually similar circular coupling elements 8a that act as toothed couplings and have a central hole and a rim with a toothed outer side. Each coupling element 8a is coupled in the gap 2a to a corresponding circular toothed coupling element 2b that has been fastened onto the inner end surface of each half of the panel 2 so that the coupling element 2b makes a reciprocating rotary motion along with the panel 2 about the pivot shaft 3a that is inserted through the central hole of the toothed coupling elements 2b and 8a.

Figure 3:
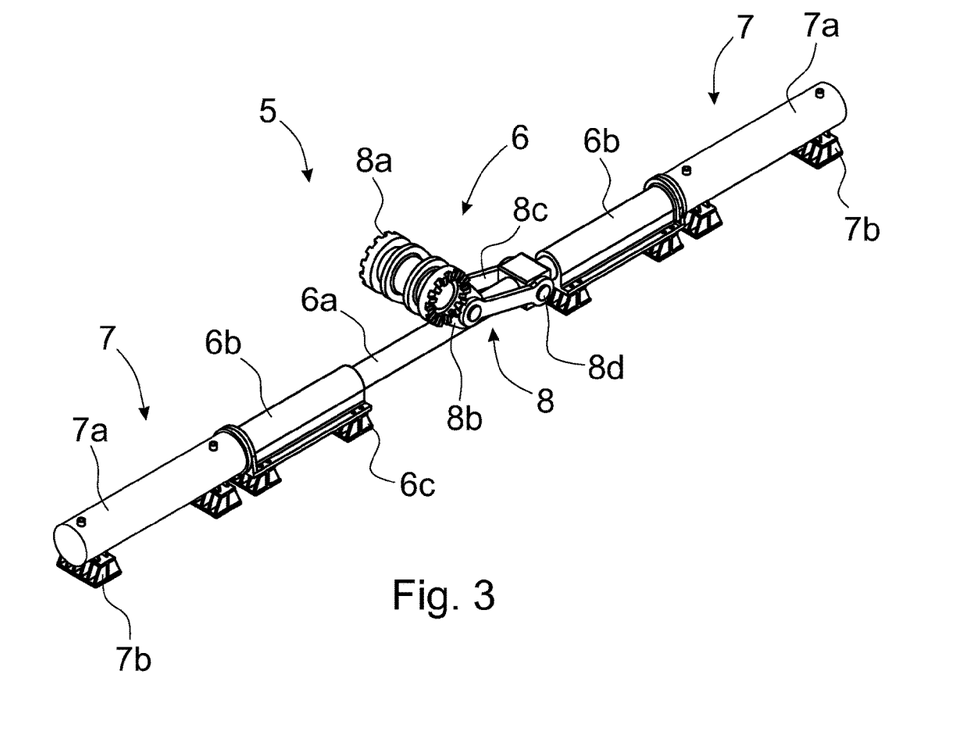
FIG. 3 presents a simplified oblique top view of a driving and power-take-off unit of the wave energy recovery apparatus according to the invention.
Figure 4:
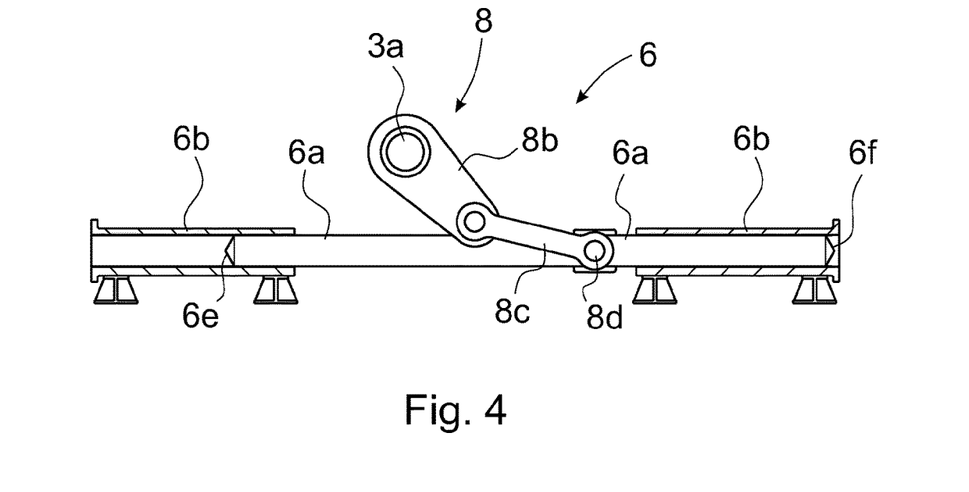
FIG. 4 presents in a side view, partially cross-sectioned and in a simplified and diagrammatic way the driving unit of the wave energy recovery apparatus according to the invention.

FIGS. 3 and 4 present more precisely the driving and PTO arrangement 5 of the wave energy recovery apparatus according to the invention. As mentioned above the driving and PTO arrangement 5 comprises the actuating mechanism 6 and one or more hydraulic PTO units 7, in this example there are two PTO units 7 that are mutually similar and placed opposite to each other at the different sides of the panel 2 in the direction of the reciprocating motion of the panel 2. In addition to the lever mechanism 8 the actuating mechanism 6 comprises the rectilinear actuating rod 6a, which can be for instance a steel pipe with a strong wall. In FIG. 3 only a casing tube of the hydraulic cylinder blocks 7a of each PTO unit 7 is shown and marked with reference number 7a. The other components of the PTO units 7 are hidden by the casing tube.

The pair of mutually similar circular coupling elements 8a is fastened to the first end of a pair of the first lever arms 8b that are pivoted at their second end to the first end of a pair of the second lever arms 8c that are further pivoted at their second end to the actuating rod 6a through a joint pin 8d that is constantly fastened to the actuating rod 6a. As mentioned above each circular coupling element 8a acts as a toothed coupling and has a central hole and a rim with a toothed outer side. The pivot shaft 3a is inserted through the central hole and the toothed outer side is connected in the gap 2a with a corresponding coupling element on the inner end surface of the panel 2. Thus, the coupling elements 8a make a reciprocating rotary motion along with the panel 2 about the pivot shaft 3a, and at the same time the levers 8b and 8c force the actuating rod 6a to move rectilinearly back and forth guided by cylinders 6b.

By this way the PTO units 7 are mechanically separated from the actuating mechanism 6 and from both the pivot shaft 3a and the panel 2. In addition the actuating rod 6a of the actuating mechanism 6 has not directly been connected to the pivot shaft 3a or to the panel 2 but the connection is implemented through the lever mechanism 8 with two successive levers 8b and 8c having a pivot joint between them. According to the arrangement of the invention the actuating mechanism 6 is arranged to act as a separate intermediate mechanism between the panel 2 and the PTO units 7. That makes an easy and fast removal and installation of the PTO units 7 possible.

Each pusher end 6e, 6f of the actuating rod 6a is closed into the guiding cylinder 6b that is fastened to the base 1 through support pedestals 6c. Both the pusher ends 6e, 6f of the actuating rod 6a are arranged to slide guided back and forth inside the guiding cylinders 6b. The length of the guiding cylinders 6b is so dimensioned that the ends 6e, 6f of the actuating rod 6a keep always inside the guiding cylinders 6b during the reciprocating linear motion of the actuating rod 6a. Thus, the length of the guiding cylinder 6b is greater than the reciprocating linear motion of the actuating rod 6a. This makes the removal and installation of the PTO units 7 possible without stopping the reciprocating motion of the panel 2. This also makes the easy storm protection possible by only locking the pistons 9 inside their hydraulic cylinder block 7a and closing the ends of the cylinders 6b and the casing tubes of the PTO units 7. Then the panel 2 can freely follow the motion of the waves and the actuating rod 6a makes freely linear reciprocating motion in the cylinders 6b without causing any forces to other structures of the arrangement.

The hydraulic PTO unit 7 is connected water tightly and co-axially to the free end of each guiding cylinder 6b. The hydraulic cylinders blocks 7a are fastened to the base 1 through support pedestals 7b. The cylindrical pistons 9 are placed inside the hydraulic cylinder block 7a so that between the closed end or the second end of the hydraulic cylinders 7h and the second end of the pistons 9 there are sealed pressure spaces 9a that are filled with hydraulic fluid that is circulated in the hydraulic circuit 9b of the hydraulic PTO unit 7 for converting the captured wave energy for instance to electric energy. The cylindrical pistons 9 equipped with piston rods 9e are arranged to move inwards toward the closed end of the hydraulic cylinders 7h by the rectilinear thrust caused by the actuating rod 6a, and back outwards, following the return motion of the actuating rod 6a, by a pressure prevailing in the hydraulic circuit 9b of the PTO unit 7 and returned the pressure space 9a for instance through an appropriate connector that is not shown in the drawings. When the pistons 9 are moving inwards they cause a pressure to the hydraulic circuit 9b of the hydraulic PTO unit 7, which pressure rotates for instance generators to produce electric energy.

Figure 5:
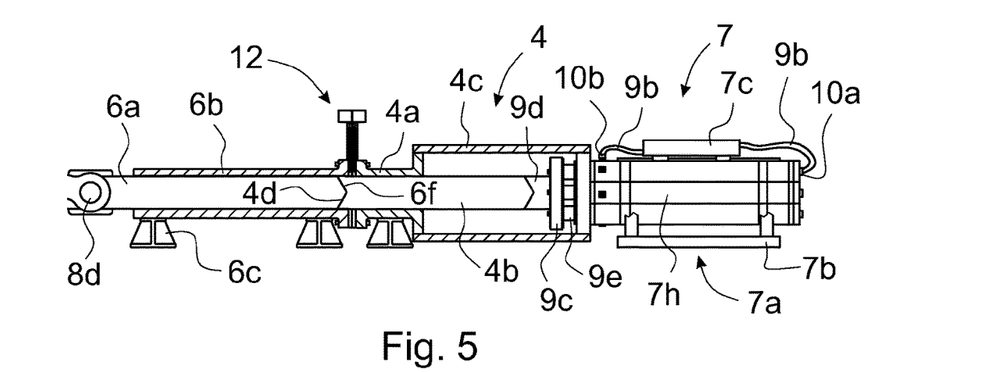
FIG. 5 presents in an enlarged side view, cross-sectioned, and in a simplified and diagrammatic way one end of the driving and power-take-off arrangement of the wave energy recovery apparatus according to the invention in the first position.
Figure 6:
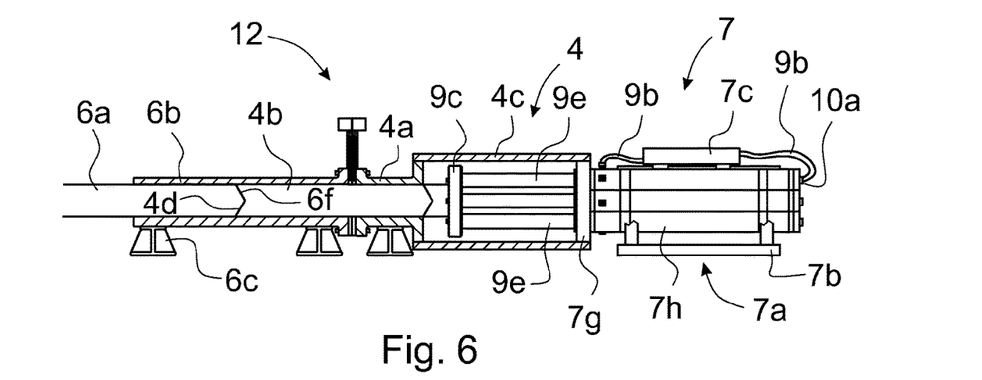
FIG. 6 presents in an enlarged side view, cross-sectioned, and in a simplified and diagrammatic way one end of the driving and power-take-off arrangement of the wave energy recovery apparatus according to the invention in the second position.
Figure 7:
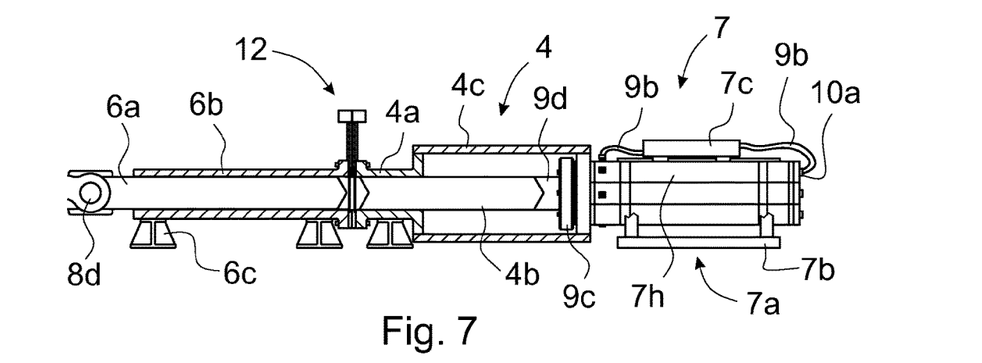
FIG. 7 presents in a side view, cross-sectioned, and in a simplified and diagrammatic way one end of the driving and power-take-off arrangement of the wave energy recovery apparatus according to the invention the power-take-off unit ready to be separated from the driving unit.

FIGS. 5-7 present in an enlarged side view, cross-sectioned, and in a simplified and diagrammatic way the second end of the driving and PTO arrangement 5 of the wave energy recovery apparatus according to the invention. In addition to the actuating mechanism 6 and one or more hydraulic PTO units 7 mentioned above the driving and PTO arrangement 5 comprises also a connecting mechanism 4 that acts as a part of the power transmission mechanism of the PTO units 7 between the actuating mechanism 6 and the hydraulic PTO units 7. The connecting mechanism 4 comprises a guiding cylinder 4a, a connecting rod 4b making a reciprocating motion guided by the guiding cylinder 4a, and a casing 4c connecting the second end of the guiding cylinder 4a and the first end of the hydraulic cylinder block 7a water tightly to each other. The connecting rod 4b and the piston rods 9e are making reciprocating motion partially inside the casing 4c. The first end of the guiding cylinder 4a is connected water tightly to the second end of the guiding cylinder 6b of the actuating rod 6a. Preferably a closing and sealing mechanism 12 is placed between the connecting ends of the guiding cylinders 4a and 6b. The casing structure of PTO units 7 shown in FIG. 3 differs from the casing structure of PTO units 7 shown in FIGS. 5-7 but otherwise the structure of the apparatus can be the same.

The structure of the driving and PTO arrangement 5 can be construed also so that the separate connecting mechanism 4 is not needed. Then an extension 9d in the first end of the connecting plate 9c of the piston rods 9e must be longer. The length should be equal to the sum of the length of the connecting rod 4b and the extension 9d of the connecting plate 9c in the present embodiment.

In the situation of FIG. 5 the actuating rod 6a is at its utmost position to push the pistons 9 inside the second hydraulic cylinder block 7a towards the closed end of the cylinders 7h. The most of the hydraulic fluid in the space 9a has been pressed to the hydraulic circuit 9b of the hydraulic PTO unit 7 for instance through connectors 10a, and the first end 4d of the connecting rod 4b between the actuating rod 6a and the extension 9d of the connecting plate 9c of the piston rods 9e of the pistons 9 of the hydraulic cylinder block 7a is still inside the guiding cylinder 6b strongly in touch with the second pusher end 6f of the actuating rod 6a. The second pusher end 6f of the actuating rod 6a and the first end 4d of the connecting rod 4b are advantageously shaped mutually so that the pushing force of the actuating rod 6a is directed as centralized and rectilinearly as possible to the connecting rod 4b and further to the piston rods 9e without causing any lateral forces. Thus, for instance the shape of the second pusher end 6f of the actuating rod 6a is in the longitudinal direction of the actuating rod 6a outwardly conical or spherical and correspondingly the first end 4d of the connecting rod 4b is inwardly conical or spherical, or vice versa. The same conical or spherical forms apply also to the first end of the driving and PTO arrangement 5 with the pusher end 6e of the actuating rod 6a, and the second ends of the connecting rods 4b pushing the extensions 9d of the connecting plates 9c.

In FIGS. 5-7 also an energy conversion machinery 7c of the PTO unit 7 is shown. The energy conversion machinery 7c comprises for instance a hydraulic motor, one or more generators and a control unit. The hydraulic motor receives its driving force from the hydraulic circuit 9b through the connectors 10a and rotates the generators to produce electric energy.

FIG. 6 presents in an enlarged side view, cross-sectioned, and in a simplified and diagrammatic way the second end of the driving and PTO arrangement 5 of the wave energy recovery apparatus according to the invention in the second position where the panel 2 has moved to its opposite position and the first end of the actuating rod 6a is pushing the pistons 9 inside the second hydraulic cylinder block 7a towards the closed end of the cylinders 7h. At the same time the second end of the actuating rod 6a has retracted to its innermost position inside the guiding cylinder 6b, and the connecting rod 4b and the connecting plate 9c with the piston rods 9e have followed the actuating rod 6a so that the whole package comprising the actuating rod 6a, the connecting rod 4b and the connecting plate 9c with its extension 9d and piston rods 9e has kept tightly together. This function is achieved for instance by a pressure prevailing in the hydraulic circuit 9b of the PTO unit 7 which pressure is returned the pressure spaces 9a, or by springs or another appropriate actuator. In that situation the pistons 9 are their utmost open position and the volume of the pressure spaces 9a of the hydraulic cylinders 7h is at their maximum.

When the hydraulic cylinder block 7a is in function the first end 4d of the connecting rod 4b is always inside the guiding cylinder 6b. However, in order to remove the PTO unit 7 the hydraulic cylinder block 7a must be separated from the guiding cylinder 6b. Before the removal the first end 4d of the connecting rod 4b is taken away from the guiding cylinder 6b and the pistons 9 are pressed towards the closed end of the cylinders 7h by a pressure of the hydraulic circuit 9b of the hydraulic PTO unit 7 for instance through connectors 10b from where the hydraulic fluid runs to a hollow cylindrical space 11 between the inner surface of the cylinders 7h and the outer surface of the first section of the pistons 9 which first section of the pistons 9 is smaller in its diameter than the second section of the pistons 9 closer to the closed end of the cylinders 7h. In this way the pistons 9 can be locked almost in their entirety inside the cylinder block 7a, and after that the cylinder block 7a can be easily and safely separated from the guiding cylinder 6b.

The arrangement comprises also a locking mechanism that locks the second end of the connecting rod 4b to the extension 9d so that when the pistons 9 are run into their locking positions inside the cylinders 7h the extension 9d draws the connecting rod 4b with so that the connecting rod 4b keeps tightly in touch with the extension 9d. FIG. 7 presents the situation where the pistons 9 are locked in their innermost positions and the hydraulic cylinder block 7a of the PTO unit 7 is ready to be separated from the guiding cylinder 6b and the PTO unit 7 is ready to be lifted to the surface of the water.

However, before the removal of the hydraulic cylinder block 7a both the free end of the hydraulic cylinder block 7a and the free end of the guiding cylinder 6b must be closed and sealed against seawater. For the sake of clarity the closing and sealing mechanism 12 is not shown in FIGS. 1-4.

Figure 8:
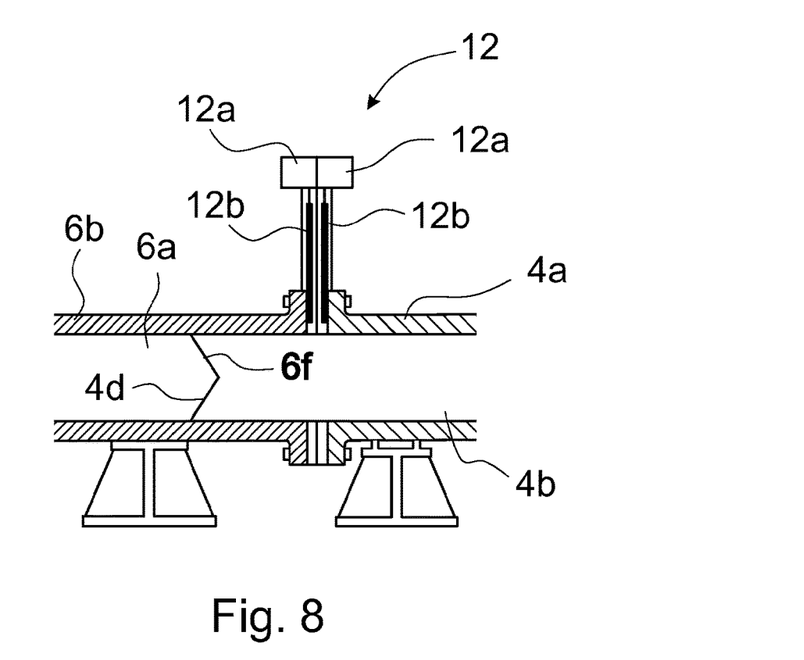
FIG. 8 presents in an enlarged side view, cross-sectioned, and in a simplified and diagrammatic way a connection between the driving arrangement and the power-take-off arrangement of the wave energy recovery apparatus according to the invention when the power-take-off arrangement is fastened to the driving arrangement.
Figure 9:
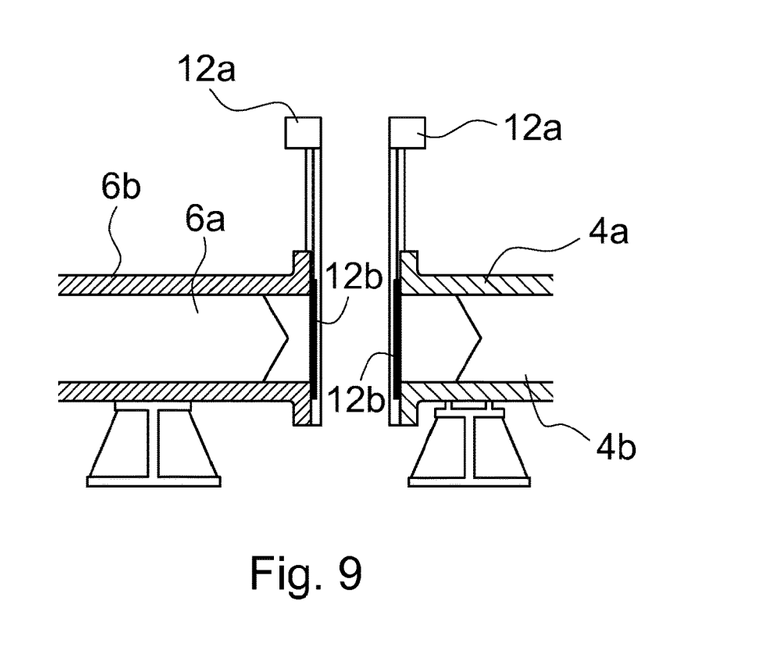
FIG. 9 presents in an enlarged side view, cross-sectioned, and in a simplified and diagrammatic way a connection between the driving arrangement and the power-take-off arrangement of the wave energy recovery apparatus according to the invention when the power-take-off arrangement is separated from the driving arrangement.

One embodiment of the closing and sealing mechanism 12 is shown in FIGS. 8 and 9. In this embodiment the closing and sealing mechanism 12 is placed between the free end of the guiding cylinder 4a of the connecting rod 4b and the free end of the guiding cylinder 6b. The closing and sealing mechanism 12 comprises for instance two gate valves that are installed into the opening of both the cylinders 6b and 4a. Each gate valve comprises for instance a manual or electric actuator 12a and a gate 12b that is moved by the actuator 12a either to close the openings of the cylinders 6b and 4a when the guiding cylinder 4a together with the PTO unit 7 has to be removed, or to open the openings of the cylinders 6b and 4a for activating the wave energy recovery arrangement. In FIG. 8 the gate valves are open and the gates 12a have been moved away from the front of the openings of the cylinders 6b and 4a, and the first end 4d of the connecting rod 4b is inside the guiding cylinder 6b. In FIG. 9 the gate valves are closed and the gates 12a have been moved to the front of the openings of the cylinders 6b and 4a, and the first end 4d of the connecting rod 4b is inside the guiding cylinder 4a of the connecting rod 4b.

The closing and sealing mechanism 12 of the cylinder ends can also be different from what is presented above. Instead of gate valves, also spherical valves can be used, or the closing and sealing mechanism 12 can comprise a first separate closing and sealing part in the cylinder 6b in front of the pusher end 6e, 6f of the actuating rod 6a, and a second separate closing and sealing part in the guiding cylinder 4a in front of the first end 4d of the connecting rod 4b. The closing and sealing parts can be short and cylindrical and their ends can be outwardly and inwardly conical or spherical to match to the pusher ends 6e, 6f of the actuating rod 6a and to the first end of the connecting rod 4b. In addition the closing and sealing parts comprise a locking mechanism, for instance a hydraulic locking mechanism to lock the closing and sealing parts at the opening end of the cylinders 6b and 4a. During the working phase the closing and sealing parts make reciprocating motion inside the cylinders 6b and 4a closed to each other between the pusher ends 6e, 6f of the actuating rod 6a and the first end of the connecting rods 4b.

Figure 10:
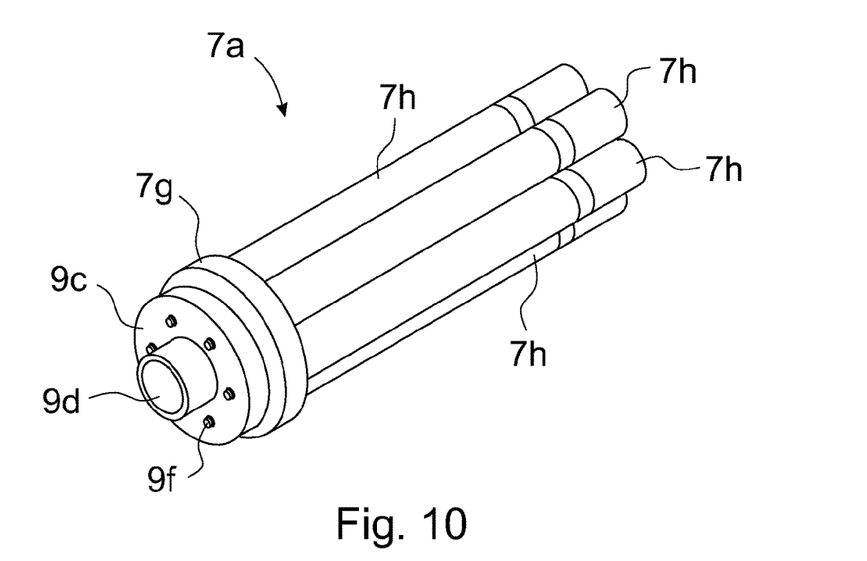
FIG. 10 presents a simplified oblique top view of a part of the power-take-off arrangement of the wave energy recovery apparatus according to the invention.

FIGS. 10-14 present more precisely one embodiment of the hydraulic cylinder block 7a of PTO unit 7 of the present invention. In FIG. 10 the pistons 9 are in their innermost position, in FIG. 11 in their outermost position, and in FIG. 12 about in their center position.

Figure 11:
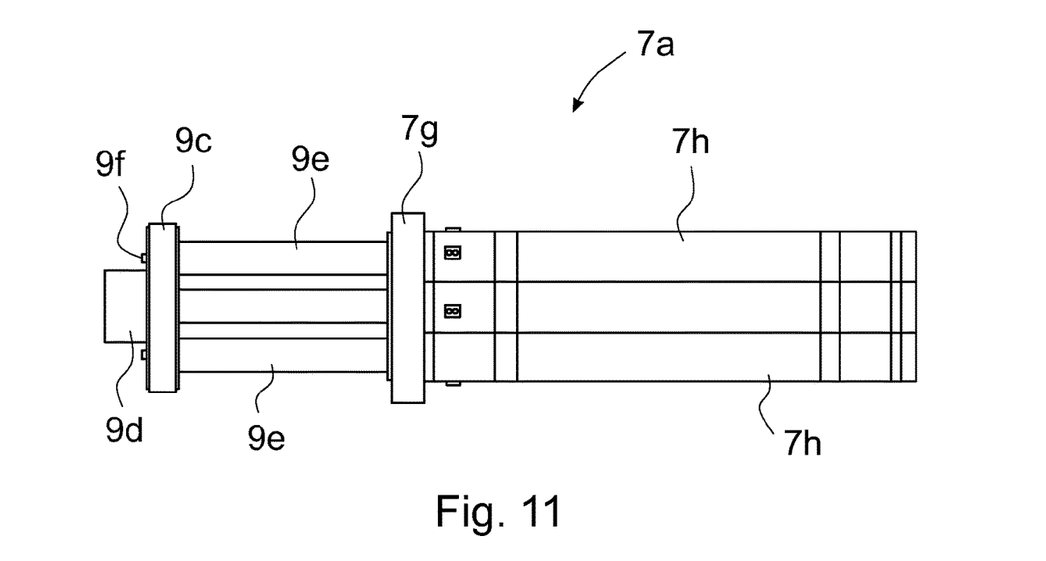
FIG. 11 presents in a side view and in a simplified and diagrammatic way the part of the power-take-off arrangement according to FIG. 10.
Figure 12:
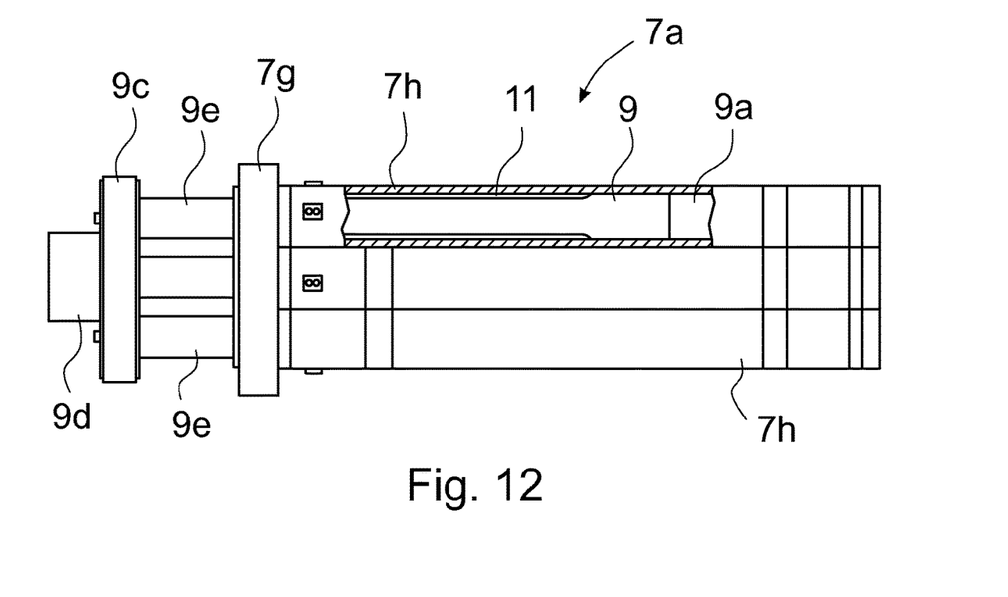
FIG. 12 presents in a side view, partially cross-sectioned and in a simplified and diagrammatic way the power-take-off arrangement according to FIG. 10.

Instead of one large hydraulic cylinder and piston the PTO unit 7 of the invention comprises a group 7a of smaller hydraulic cylinders 7h that all are fastened to a common end plate 7g with their open ends or the first ends. The end plate 7g is a strong and thick plate and forms a heavy and durable frame for the hydraulic cylinders 7h. The piston rods 9e of the pistons 9 are fastened to the common connecting plate 9c that is also a strong and thick plate and forms a heavy and durable frame for the piston rods 9e that are fastened with their free end to the connecting plate 9c with fastening means 9f such as screws. A cylindrical extension 9d is fastened in the center of the first side of the connecting plate 9c facing towards the actuating rod 6a when the PTO unit 7 is installed in its working place.

The first end of the extension 9d comprises an inwardly or outwardly conical or spherical shape that matches to the outwardly or inwardly conical or spherical shape of the second end of the connecting rod 4b as described earlier. When the actuating rod 6a pushes the connecting rod 4b towards the cylinder block 7a the connecting rod 4b pushes further the extension 9d and the connecting plate 9c to the same direction, and the connecting plate 9c pushes further all the pistons 9 simultaneously inwards into the hydraulic cylinders 7h after which the connecting plate 9c draws all the pistons 9 simultaneously outwards from the hydraulic cylinders 7h. So, the connecting plate 9c moves all the pistons 9 at the same time.

The number of hydraulic cylinders 7h in the cylinder block 7a is preferably an even number, for instance 2, 4, 6, 8 or 10 or even more. In this example the number is six and all the six hydraulic cylinders 7h are placed symmetrically next to each other and/or one upon the other. Several small hydraulic cylinders make it possible to construct a lighter and more durable structure than using only one big cylinder that must be very massive to stand all the strains caused by the waves. In addition, using several small cylinders whose sizes can also vary gives much more versatile possibilities to control the wave energy capture.

FIG. 12 presents in a side view, partially cross-sectioned and in a simplified and diagrammatic way the hydraulic cylinder block 7a according to FIG. 10. One of the two uppermost hydraulic cylinders 7h has been partially cross-sectioned so that the piston 9, pressure pace 9a and the hollow cylindrical space 11 between the inner surface of the cylinder 7h and the outer surface of the first section of the pistons 9 is seen. By the help of the hollow cylindrical space 11 the pistons 9 can be locked almost in their entirety inside the cylinder block 7a as is described above.

Figure 13:
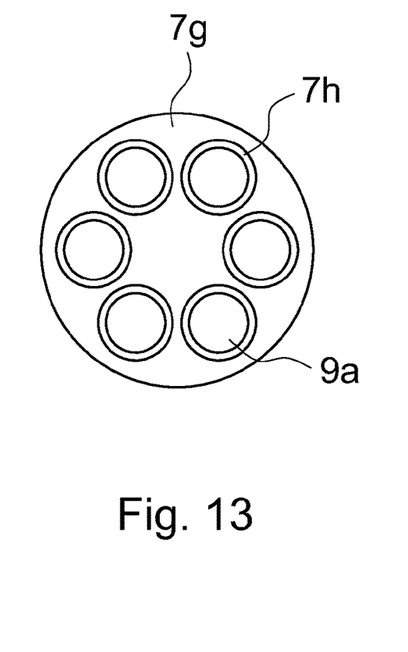
FIG. 13 presents in a front view and in a simplified and diagrammatic way an end plate with cylinders of the cylinder block of the power-take-off arrangement according to FIG. 10.
Figure 14:
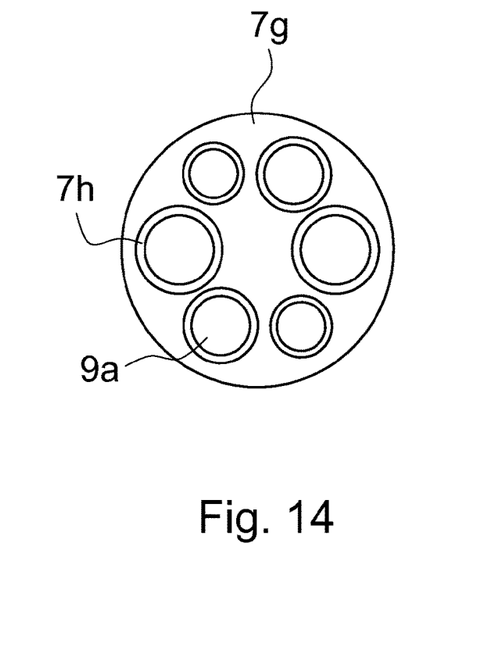
FIG. 14 presents in a front view and in a simplified and diagrammatic way another end plate with cylinders of the cylinder block of the power-take-off arrangement according to FIG. 10.

FIGS. 13 and 14 present in a front view and in a simplified and diagrammatic way the common end plate 7g of the cylinders 7h of the cylinder block 7a according to FIG. 10. In the solution of FIG. 13 all the cylinders 7h with their inner diameter are of the same size and they are arranged to work in pairs so that there are three pairs of cylinders 7h which all are of the same size. In the solution of FIG. 14 there are three pairs of cylinders 7h each pair having two cylinders 7h that are mutually equal-sized but in the other pairs the sizes of the cylinders 7h are different. So, the solution has three different sizes of hydraulic cylinders 7h in pairs.

As mentioned above the cylinders 7h are arranged to work in pairs, and the cylinders 7h are placed for instance in a circle symmetrically for instance in relation to the horizontal and vertical centerlines and the center axis of the end plate 7g. When the cylinder block 7a has six cylinders 7h all the cylinders 7h in the circle are 60 degrees from each other. Then, for instance, in the solution of FIG. 14 the first smallest cylinder 7h is in the upper left corner of the cylinder layout and the other corresponding smallest cylinder 7h is in the lower right corner of the cylinder layout symmetrically in the other side of the center axis of the end plate 7g. The size here means the inner diameter of the hydraulic cylinders 7h.

As mentioned earlier several small cylinders 7h makes the control of the wave recovery apparatus more flexible. The cylinders 7h or pair of cylinders 7h can be deactivated and activated one by one depending on weather conditions or when a cylinder or a pair of cylinders need maintenance or repair. For instance when the availability of wave energy is low only one cylinder 7h or pair of cylinders 7h are kept activated and the other are deactivated, and when the availability is becoming better more and more cylinders 7h or pairs of cylinders 7h are activated. The deactivation and activation of the cylinders 7h can be made for instance by a valve control.

Figure 15:
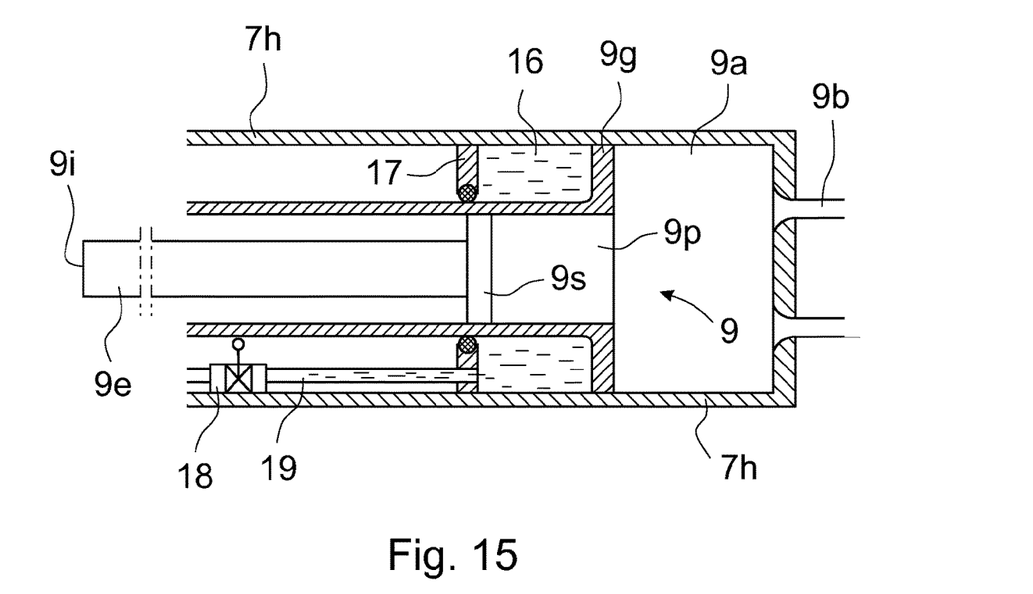
FIG. 15 presents in a side view, partially cross-sectioned and in a simplified and diagrammatic way a second end of one cylinder of the power-take-off arrangement according to one embodiment of the invention.

FIG. 15 presents one more embodiment of the invention where control possibilities are yet more flexible. The structure of the embodiment is a double volume or dual-acting solution that comprises two pistons of a different size in the same hydraulic cylinder 7h. The piston 9 inside the hydraulic cylinder 7h comprises a first diameter piston head 9g whose rod has a hollow space 9p that comprises a second diameter piston head 9s whose diameter is smaller than the diameter of the first diameter piston head 9g, and which second diameter piston head 9s can move axially independently of the first diameter piston head 9g.

The structure has also a locking mechanism to lock the two pistons heads 9g and 9s together to move simultaneously without having an axial motion in relative to each other. The locking mechanism is for instance a hydraulic locking mechanism comprising a pressure chamber 16 that is formed between the back wall of the first diameter piston head 9g and a stationary wall 17, and a hydraulic valve 18 connected with a channel 19 to the pressure chamber 16. Also other types of locking members can be used.

The piston rod 9e of the second diameter piston head 9s corresponds the piston rods 9e mentioned above and is secured in its first end 9i to the connecting plate 7g at the same way as the piston rods 9e mentioned above. A group of two-piston cylinders like this can be assembled in the same kind of a cylinder block 7a as is mentioned above. Yet more control flexibility is achieved when two-piston cylinders are in pairs of different sizes as is described in connection with FIG. 14. Then there are for instance a pair of the smallest two-piston cylinders, a pair of the second smallest two-piston cylinders and a pair of the largest two-piston cylinders. The size here means the inner diameter of the hydraulic cylinders 7h.

Table 1 below shows different control variations when using different cylinder pairs in the hydraulic cylinder block 7a according to the invention.

The first column headed "N/V" shows the number of different variations or alternatives, and the column headed "Equal-sized cylinder pairs" gives the control variations when using three pairs of cylinders of the same size. It can be seen that in that case there are three different alternatives to control the energy capturing; either to use the first pair (p1) alone or together with the second pair (p2) or to use all three pairs simultaneously. Using for instance pairs (p2) and (p3) gives the same result as using (p1) and (p2) because all the pairs are equal.

TABLE 1

| N/V | Equal-sized cylinder pairs | | | Cylinder pairs of a different size | | | Equal-sized dual-acting cylinder pairs | | | Dual-acting cylinder pairs of a different size | | |
|---|---|---|---|---|---|---|---|---|---|---|---|---|
| 1 | p1 | | | ps | | | D1 | | | Ds | | |
| 2 | p1 | p2 | | pm | | | d1 | | | ds | | |
| 3 | p1 | p2 | p3 | pg | | | D1 | D2 | | Dm | | |
| 4 | | | | ps | pm | | D1 | d2 | | dm | | |
| 5 | | | | pm | pg | | d1 | d2 | | Dg | | |
| 6 | | | | ps | pg | | D1 | D2 | D3 | dg | | |
| 7 | | | | ps | pm | pg | D1 | D2 | d3 | Ds | Dm | |
| 8 | | | | | | | D1 | d2 | d3 | Ds | dm | |
| 9 | | | | | | | d1 | d2 | d3 | ds | Dm | |
| 10 | | | | | | | | | | ds | dm | |
| 11 | | | | | | | | | | Dm | Dg | |
| 12 | | | | | | | | | | Dm | dg | |
| 13 | | | | | | | | | | dm | Dg | |
| 14 | | | | | | | | | | dm | dg | |
| 15 | | | | | | | | | | Ds | Dg | |
| 16 | | | | | | | | | | Ds | dg | |
| 17 | | | | | | | | | | ds | Dg | |
| 18 | | | | | | | | | | ds | dg | |
| 19 | | | | | | | | | | Ds | Dm | Dg |
| 20 | | | | | | | | | | Ds | Dm | dg |
| 21 | | | | | | | | | | Ds | dm | Dg |
| 22 | | | | | | | | | | ds | Dm | Dg |
| 23 | | | | | | | | | | Ds | dm | dg |
| 24 | | | | | | | | | | ds | dm | dg |
| 25 | | | | | | | | | | ds | dm | Dg |
| 26 | | | | | | | | | | ds | Dm | Dg |

The column headed "Cylinder pairs of a different size" gives the control variations when using three pairs of cylinders but now the pairs comprise cylinders 7h of a different size so that the first pair (ps) includes two smallest cylinders 7h that are mutually equal, the second pair (pm) includes two second smallest cylinders 7h that are mutually equal, and the third pair (pg) includes two largest cylinders 7h that are mutually equal. In that case there are seven different alternatives to combine the use of the cylinder pairs for controlling the energy capturing.

The column headed "Equal-sized dual-acting cylinder pairs" gives the control variations when using three pairs of cylinders but now the pairs comprise dual-action cylinders 7h of the same size. The cylinders 7h are for example the two-piston cylinders 7h explained in connection with FIG. 15. All the pairs have two modes of action, namely the mode where the larger piston head 9g together with the smaller piston head 9s is in action, and the mode where only the smaller piston head 9s is in action. In the first pair of cylinders these modes have been marked (D1) and (d1), in second pair of cylinders (D2) and (d2), and in third pair of cylinders (D3) and (d3). For instance the eighth alternative of this solution is marked "D1, d2, d3". It means that in this control variation the smaller piston head 9s together with the larger piston head 9g is used in the first cylinder pair, and the smaller piston heads 9s only are used in the second and third cylinder pairs. In that case there are nine different alternatives to combine the use of the cylinder pairs for controlling the energy capturing.

And finally, the column headed "Dual-acting cylinder pairs of a different size" gives the control variations when using three pairs of dual-acting cylinders but now the pairs comprise cylinders 7h of a different size so that the first pair includes two smallest dual-action cylinders 7h that are mutually equal, the second pair includes two second smallest dual-action cylinders 7h that are mutually equal, and the third pair includes two largest dual-action cylinders 7h that are mutually equal. Each dual-action cylinder 7h comprises two piston heads 9g, 9s of a different size, and therefore the pairs have two modes of action, as described above. In the first pair of cylinders these modes have been marked (Ds) and (ds), in second pair of cylinders (Dm) and (dm), and in third pair of cylinders (Dg) and (dg). Thus, for instance, (Ds) means the smaller cylinder head 9s together with the larger cylinder head 9g in the smallest pair of cylinders and (ds) means the smaller cylinder head 9s only of the smallest pair of cylinders. In that case there are 26 different alternatives to combine the use of the cylinder pairs and their piston heads for controlling the energy capturing. Here also the size of the cylinder 7h means the inner diameter of the hydraulic cylinders 7h.

Figure 16:
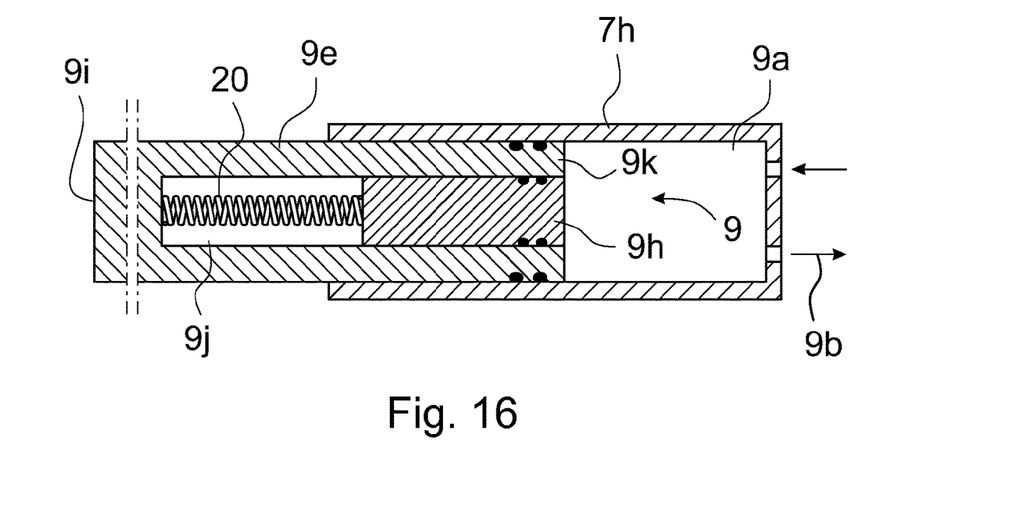
FIG. 16 presents in a side view, partially cross-sectioned and in a simplified and diagrammatic way a second end of one cylinder of the power-take-off arrangement according to another embodiment of the invention.

FIG. 16 presents in a side view, cross-sectioned and in a simplified and diagrammatic way a second end of a cylinder 7h of the hydraulic cylinder block 7a according to yet another embodiment of the invention. Huge forces, momentary fast motions and momentary pauses are typical for wave energy recovery apparatuses. When the machinery starts working after a pause a momentary pressure chock arises because the hydraulic fluid cannot run so fast into the pipeline and the fluid has its own inertia. That kind of a pressure chock stresses the structures of the apparatus. The solution shown in FIG. 16 comprises a piston 9 with a shock absorber in the hollow center space 9j of the piston head 9k. The shock absorber comprises a damping piston 9h that is installed to move axially in the hollow center space 9j inside the piston head 9k. A damping element 20 is installed into the hollow center space 9j to dampen the axial motion of the damping piston 9h when the pressure increases in the pressure space 9a and the damping piston 9h moves inwards in the hollow center space 9j. The damping element 20 is for instance a spring that can be adjusted according to need. Instead of a spring the damping element can also be a hydraulic-gas space or an electric coil system.

The momentary pressure chock is dampened with the damping piston 9h whose damping element 20 has been adjusted so that it forms an appropriate counter pressure. When the momentary pressure chock grows bigger than the counter pressure of the damping element 20 the damping piston 9h moves inwards and thus saves the structures. The energy charged into the damping element 20 returns at the end of the power stroke when the pressure in the pressure space 9a reduces.

The piston rod 9e of the piston head 9 corresponds the piston rods 9e mentioned above and is secured in its first end 9i to the connecting plate 9c at the same way as the piston rods 9e mentioned above. A group of dampened cylinders like this can be assembled in the same kind of a cylinder block 7a as is mentioned above.

In the arrangement according to the invention the reciprocating motion of the panel 2 is transferred mechanically to a linear motion of the power transmission mechanism of each PTO unit 7 through the mechanical intermediate mechanism between the panel 2 and the PTO units 7. In that case the reciprocating motion of the panel 2 is transferred first to the lever mechanism 8 and through the lever mechanism 8 to the actuating rod 6a that is guided to make a reciprocating linear motion in the rate of the reciprocating motion of the panel 2. When the capture of the wave energy is activated the actuating rod 6a is arranged to push the power transmission mechanism of each PTO unit 7 in turns in order to produce a linear thrust motion for converting the wave energy to another type of energy. The transmission mechanism of each PTO unit 7 comprises at least the pistons 9, the connecting plate 9c with its extension 9d, and the connecting rod 4b that is a separate element in this example but can also be combined with the connecting plate 9c being a statutory part of the connecting plate 9c.

When the PTO unit 7 needs maintenance or repairs the PTO unit 7 is removed or detached in its entirety from the wave energy recovery apparatus. In that case the connecting rod 4b that is partially inside the guiding cylinder 6b is at first moved out from the guiding cylinder 6b of the actuating rod 6a and after that the closing and sealing mechanism 12 for closing the open end of the guiding cylinder 6b is activated and the open end of the guiding cylinder 6b is water tightly closed. Also the open end of the guiding cylinder 4a of the connecting rod 4b is water tightly closed with the closing and sealing mechanism 12, and the power transmission mechanism, such as the pistons 9 are locked inside the hydraulic cylinders 7h, for instance by the hydraulic pressure of the hydraulic circuit 9b of the PTO unit 7. After that the PTO unit 7 is lifted up to the surface of the water.

The installation of the PTO unit 7 is made in an opposite order. At first the PTO unit 7 is descended onto the base 1 and fastened at its place. After that the guiding cylinders 4a and 6b are fastened to each other and the closing and sealing mechanism 12 is opened, after which the power transmission mechanism, such as the pistons 9 are unlocked inside the hydraulic cylinders 7h and the first end of the connecting rod 4b is moved into the guiding cylinder 6b in a touching contact with the pusher end of the actuating rod 6a. After that the wave recovery apparatus is ready to operate.

The wave recovery apparatus according to the invention is easy and fast to protect against stormy conditions. When the storm protection is needed the pistons 9 of the PTO units 7 with the connecting rod 4b are run inside the hydraulic cylinders 7h and locked into their utmost inner position. Then the first end of the connecting rod 4b is inside its own guiding cylinder 4a, and the panel 2 and the actuating rod 6a may make their reciprocating motion freely without the risk that the structures of the wave recovery apparatus would suffer damages. To be even safer the guiding cylinders 4a and 6b can be mechanically separated and their open ends can be closed with the closing and sealing mechanism 12.

It is obvious to the person skilled in the art that the invention is not restricted to the examples described above but that it may be varied within the scope of the claims presented below. Thus, for example, the structure and positions of the actuating mechanism and lever mechanism can be different from what is presented.

It is also obvious to the person skilled in the art that the structure of the power-take-off machineries can differ from what is presented above. For instance the hydraulic cylinders of the PTO units can be used to convert the captured wave energy to pressurized seawater with a pressure between approximately 1-300 bar. That kind of pressurized water can be used as working medium for various tools us such, or for instance in devices for desalination purposes. In that case salt can be removed from the seawater using the reverse osmosis (RO) technology with a pressure between approximately 40-80 bar, or using the evaporation technology with a pressure between approximately 1-10 bar.

What is claimed is:

1. Wave energy recovery apparatus with an energy transfer arrangement comprising at least a base, a reciprocating panel, a pivot shaft for the reciprocating panel, a control system, and a driving and power-take-off (PTO) arrangement equipped with an actuating mechanism, and one or more power-take-off (PTO) units to convert kinetic energy of waves or tidal currents to another type of energy, each PTO unit comprising a hydraulic power transmission mechanism having hydraulic cylinders with pistons inside the hydraulic cylinders, which pistons are fastened with their free ends to a common connecting plate that is arranged to move all the pistons simultaneously inwards into the hydraulic cylinders and to draw all the pistons simultaneously outwards from the hydraulic cylinders, and in which arrangement the cylinders are arranged to work in pairs, each pair comprising two similar cylinders and two similar pistons, wherein the arrangement comprises at least two or more pairs of hydraulic cylinders with pistons which all are fastened to the same common connecting plate, wherein the apparatus compromises a closing and sealing mechanism that has been arranged to protect pusher ends of the actuating rod, and if needed the first end of the power transmission mechanism of each PTO unit from the seawater when the PTO units are detached from the actuating mechanism, and or when the apparatus is protected against stormy conditions.

2. Wave energy recovery apparatus according to claim 1, wherein the power transmission mechanism of the PTO unit comprises a group of hydraulic cylinders that are fastened to a common end plate with their open ends, a cylinder layout being substantially symmetrical in relation to a horizontal centerline, a vertical centerline, and a center axis of the end plate.

3. Wave energy recovery apparatus according to claim 1, wherein the group of hydraulic cylinders comprises a group of cylinder pairs where the inner diameter of the cylinders is essentially the same from pair to pair.

4. Wave energy recovery apparatus according to claim 1, wherein the group of hydraulic cylinders comprises a group of cylinder pairs where the inner diameter of the cylinders is different from pair to pair.

5. Wave energy recovery apparatus according to claim 1, wherein the piston rods of the pistons are fastened with their free ends to the common connecting plate that comprises an extension in its center axis to receive a rectilinear thrust caused by the actuating rod of the actuating mechanism.

6. Wave energy recovery apparatus according to claim 1, wherein the power transmission mechanism of the PTO unit comprises a connecting rod making a reciprocating motion between the actuating rod and an extension of the connecting plate.

7. Wave energy recovery apparatus according to claim 1, wherein the cylinders of each pair are placed symmetrically in relation to a horizontal centerline, a vertical centerline, and a center axis of the end plate.

8. Wave energy recovery apparatus according to claim 1, wherein some pairs of cylinders or all pairs of cylinders comprise two piston heads of a different size within each other inside the same cylinder.

9. Wave energy recovery apparatus according to claim 8, wherein the piston inside the hydraulic cylinder comprises a first diameter piston head having a hollow space comprising a second diameter piston head whose diameter is smaller than the diameter of the first diameter piston head, and which second diameter piston head is arranged to move axially independently of the first diameter piston head or when locked to the first diameter piston head together with the first diameter piston head.

10. Wave energy recovery apparatus according to claim 8, wherein the control system of the wave energy recovery apparatus is arranged to control the relative motions of the piston heads.

11. Wave energy recovery apparatus according to claim 1, wherein the piston inside the hydraulic cylinder comprises a shock absorber having a damping piston that is arranged to move axially in a hollow center space inside the head of the piston inside the hydraulic cylinder, and that a damping element, such as a spring, a hydraulic-gas space or an electric coil system is installed into the hollow center space to dampen the axial motion of the damping piston.

12. Wave energy recovery apparatus according to claim 1, wherein the actuating mechanism is arranged to transfer the reciprocating motion of the panel through the rectilinear actuating rod mechanically to a linear motion of the pistons of each PTO unit.

13. Wave energy recovery apparatus according to claim 1, wherein the actuating rod with two unfastened pusher ends is connected through a coupling element of the panel and a lever mechanism to a lower part of the panel and arranged to make reciprocating linear motion caused by the reciprocating motion of the panel, and the lever mechanism comprises a pair of mutually similar coupling elements matching with the coupling elements of the panel, a pair of the first lever arms and a pair of the second lever arms connected mutually so that the pair of the coupling elements is fastened to the first end of the pair of the first lever arms that are pivoted at their second end to the first end of the pair of the second lever arms that are further pivoted at their second end to the actuating rod through a joint pin that is constantly fastened to the actuating rod, and that the pivot shaft is fitted through the central hole of the coupling elements.

14. Wave energy recovery apparatus according to claim 1, wherein the PTO units are mechanically separated from the pivot shaft and the panel, and the actuating rod of the actuating mechanism is connected to the pivot shaft or to the panel through the lever mechanism with at least two successive levers and having a pivot joint between the successive levers, and that the actuating mechanism is arranged to act as a separate intermediate mechanism between the panel and the PTO units that are arranged removable and detachable from the actuating mechanism by detaching the power transmission mechanism of the PTO units from the actuating rod of the actuating mechanism.

15. Wave energy recovery apparatus according to claim 1, wherein the apparatus is equipped with a protection mechanism to protect the wave recovery apparatus against stormy conditions, the protection mechanism comprising at least a mechanism to move the first end of the power transmission mechanism out from the guiding cylinder of the actuating rod, and the closing and sealing mechanism for closing the open end of the guiding cylinder.

16. Wave energy recovery apparatus according to claim 1, wherein the pusher ends of the actuating rod are arranged to push the first end of the power transmission mechanism of the PTO units in turns so that when first a first pusher end is pushing the first end of the power transmission mechanism of the first PTO unit a second pusher end is returning from pushing the first end of the power transmission mechanism of the second PTO unit; and vice versa.

17. Wave energy recovery apparatus according to claim 1, wherein the pusher ends of the actuating rod and the first end of each power transmission mechanism of the PTO units are mutually matched to each other and shaped so that the pushing force of the actuating rod is directed as rectilinearly as possible to the power transmission mechanism without causing any lateral forces, the shapes of the pusher ends of the actuating rod being in the longitudinal direction of the actuating rod outwardly conical or spherical and correspondingly the shape of first end of the power transmission mechanism being inwardly conical or spherical; or vice versa.

18. Wave energy recovery apparatus according to claim 1, wherein each pusher end of the actuating rod is arranged to make a reciprocating linear motion inside a guiding cylinder, and that the length of the guiding cylinder is greater than the reciprocating linear motion of the pusher end, and when capturing wave of tidal energy the first end of the power transmission mechanism is arranged to make a reciprocating linear motion inside a guiding cylinder of the actuating rod.

* * * * *